United States Patent
Lefort et al.

[11] Patent Number: 5,953,403
[45] Date of Patent: Sep. 14, 1999

[54] METHOD FOR PREVENTING CALL CONGESTION ON OUTGOING TRUNKS OF A LOCAL TELEPHONE EXCHANGE

[75] Inventors: Blake F. Lefort, Ottawa; R. Blair Lothian, Regina; Henry Wai Chiu Kwok, Richmond; Gary Bartholomew, Ottawa; Frankie Chun-Keung Tom, Calgary, all of Canada

[73] Assignee: Stentor Resource Centre, Inc., Ottawa, Canada

[21] Appl. No.: 08/792,296

[22] Filed: Jan. 31, 1997

[51] Int. Cl.[6] .............. H04M 7/00; H04M 15/00
[52] U.S. Cl. .............. 379/220; 379/137; 379/221; 379/224; 379/230
[58] Field of Search ....................... 379/219, 220, 379/221, 222, 224, 229, 230, 137, 138

[56] References Cited

U.S. PATENT DOCUMENTS

| | | |
|---|---|---|
| 4,345,116 | 8/1982 | Ash et al. ........................ 379/221 |
| 4,565,903 | 1/1986 | Riley ............................. 379/220 |
| 4,850,007 | 7/1989 | Marino et al. .................. 379/88.2 |
| 5,253,288 | 10/1993 | Frey et al. ..................... 379/221 |
| 5,333,184 | 7/1994 | Doherty et al. ................ 379/115 |
| 5,420,914 | 5/1995 | Blumhardt ...................... 379/114 |
| 5,473,630 | 12/1995 | Penzias et al. ................. 379/114 |

*Primary Examiner*—Harry S. Hong
*Attorney, Agent, or Firm*—Cobrin & Gittes

[57] ABSTRACT

A system and method of preventing call congestion on outgoing trunks of a local telephone exchange is provided. A virtual trunk group representing a percentage of the total trunk capacity is assigned at the local exchange for carrying calls which are likely to cause congestion. In one embodiment of the invention, call segregation is achieved by using the prefixed dialling code 1+1 followed by the destination number. In another embodiment of the invention, segregation is dynamically achieved using Advanced Intelligent Network (AIN) routing.

30 Claims, 4 Drawing Sheets

Calling Party dials: 1+1 + 604-654-8000

604-654-8000

METHOD FOR PREVENTING CALL CONGESTION ON OUTGOING TRUNKS OF A LOCAL TELEPHONE EXCHANGE

FIELD OF THE INVENTION

This invention relates to the routing of calls on outgoing trunks of a local telephone exchange, but more particularly to a method of preventing call congestion on the outgoing trunks.

BACKGROUND OF THE INVENTION

When a telephone subscriber initiates a call, the subscriber's local telephone exchange will enable the routing of the call according to the digits dialled by the subscriber. The local telephone exchange such as a class 5 Switching Point (SP) will select an idle trunk to enable the call to be routed to its destination. The selection of an idle trunk will be made according to whether access to an access tandem is required or whether the call is to be established with another class 5 type telephone exchange.

If a toll call is made, the call can either be routed via an access tandem, or another class 5 type of exchange located outside the originating office's Local Access Transport Area (LATA) depending on the destination Directory Number (DN). If a trunk is congested, the calling party will receive a fast busy tone or recorded announcement. The calling party will then have to re-initiate the call at a later time. This happens quite frequently on special anniversaries such as Mother's Day, New Year's Day, etc.

Recent changes in the way telephone subscribers make use of the telephone network have had an impact on traffic congestion of outgoing trunks of a local telephone exchange. One of these is the offering of promotional long distance rates to telephone subscribers. Long distance service providers will from time to time offer special discounts at certain times of the day to retain or attract customers. In some instances, it was found that customer response to discounted long distance rates is so overwhelming that it has resulted in congestion of a certain of number of outgoing trunks to toll or access tandems during the time the long distance promotion is in effect.

Another network access pattern that has had an impact on traffic congestion on other outgoing trunks has been the enormous popularity of the Internet. Whereas in the past subscribers would remain off-hook for an amount of time of the order of minutes, subscribers connected to the Internet can stay off-hook from tens of minutes to several hours. Thus, the enormous popularity of the Internet as well as the increase in connection time of individual subscribers has had a negative impact on traffic congestion of outgoing trunks from local telephone exchanges.

Unfortunately, along with the success of long distance promotions and Internet access via Internet Service Providers (ISP) telephone network operators have received complaints from residential, business and regular long distance traffic customers as well as those making use of toll free calls using 800 or 888 access and 900 type calls. That is, since all idle trunks can quickly be seized by a telephone exchange during promotional long distance hours, those customers requiring access to outgoing or incoming trunks to make or receive other types of calls can quickly be prevented from accessing the network.

A need therefore exists for a method of alleviating network congestion to minimize the impact on the grade of service of residential, business and regular long distance service subscribers while still being able to offer subscribers access to promotional long distance rates and access to the Internet.

SUMMARY OF THE INVENTION

According to an object of the present invention, there is provided a method of preventing call congestion on outgoing trunks of a local telephone exchange wherein the type of telephone traffic which is most likely to cause traffic congestion on the outgoing trunks is identified and then segregated from other types of traffic.

According to another object of the present invention, there is provided a method of preventing call congestion on outgoing trunks of a local telephone exchange wherein the segragated traffic is then sent via a virtual trunk group assigned to carry the segragated traffic.

According to another object of the present invention, there is provided a method of preventing call congestion on outgoing trunks of a local telephone exchange wherein the virtual trunk group represents a percentage of the total trunk capacity of the trunk.

According to another object of the present invention, there is provided a method of preventing call congestion on outgoing trunks of a local telephone exchange wherein segregation is achieved using a prefix dialling code.

According to another object of the present invention, there is provided a method of preventing call congestion on outgoing trunks of a local telephone exchange wherein segregation is achieved by using a 1+1 prefix dialing code.

According to another object of the present invention, there is provided a method of preventing call congestion on outgoing trunks of a local telephone exchange wherein segregation is automatically achieved using Advanced Intelligent Network (AIN) routing.

According to another object of the present invention, there is provided a method of preventing call congestion on outgoing trunks of a local telephone exchange wherein segregation is achieved using Automatic Route Selection (ARS).

According to an object of the present invention, there is provided a method of preventing call congestion on outgoing trunks of a local telephone exchange wherein the virtual trunk group is provided at a local telephone exchange for traffic directed to a toll or access tandem office.

According to an object of the present invention, there is provided a method of preventing call congestion on outgoing trunks of a local telephone exchange wherein the virtual trunk group is provided at a local telephone exchange for traffic directed to another local telephone exchange.

Accordingly, it is an aspect of the present invention, to provide in a telephone network having a plurality of telephone exchanges interconnected via one or more inter-office trunks, there is provided a method of preventing call congestion on outgoing trunks disposed between one local telephone exchange and another or between a telephone exchange and an access tandem, said method comprising the steps of:

receiving dialled digits associated with a call at a first telephone exchange;

determining whether the dialled digits are associated with a type of telephone traffic most likely to cause traffic congestion on outgoing trunks at the first telephone exchange;

if said call is most likely to cause congestion, selecting a segregated egress path from said first local telephone exchange; and routing said call to the segregated egress path.

According to another aspect of the invention, there is provided in a telephone network having a plurality of telephone exchanges interconnected via one or more inter-office trunks, a system for preventing call congestion on an outgoing trunk disposed between one telephone exchange and another or between the telephone exchange and an access tandem, said system comprising:

means at a first telephone exchange for receiving dialled digits;

means for determining whether the dialled digits; are associated with a type of the telephone call most likely to cause traffic congestion on outgoing trunks at the first telephone exchange;

means for selecting a segregated egress path from said first local telephone exchange if said call is determined to be of the type most likely to cause congestion; and means for routing said call to the segregated egress path.

BRIEF DESCRIPTION OF THE DRAWINGS

The invention will be better understood by an examination of the following description, together with the accompanying drawings, in which.

DESCRIPTION OF THE PREFERRED EMBODIMENTS

In order to lighten the following description, the following acronyms will be used:

AIN: Advanced Intelligent Network;
CCS7: Common Channel Signalling 7;
CLID: Calling Line Identification;
ClgPn: Calling Party Number;
DN: Directory Number;
DTMF: Dual Tone Multi-Frequency;
IEC: Inter-Exchange Carrier;
LATA: Local Access Transport Area;
NANP: North American Numbering Plan;
PSTN: Public Switched Telephone Network;
SCP: Service Control Point;
SP: Signalling Point;
SSP: Service Switching Point;
SS7: Signalling System 7;
STP: Signalling Transfer Point;

A typical SS7 network consists of signalling links and nodes. SS7 nodes are referred to as signalling points (SP) and are interconnected by signalling links. Each SS7 signalling node is assigned a unique point code, serving as the network address for message routing. SS7 signalling nodes include signalling points (SP), service switching points (SSP), service control points (SCP) and signal transfer points (STP).

Signalling points (SP) are capable of sending and receiving SS7 messages with other SS7-equipped telephone offices, and routing calls based on the information exchanged. Incoming messages are formatted and transferred to the relevant processing function in the switch. Outgoing messages are transmitted over the signalling links. SPs interact with databases to provide services and routing.

Service switching points (SSPS) are switches equipped to halt call progress, launch an SS7 query to obtain additional routing information from an SCP, and then route or treat the call based on the information received in the SCP's response. SSPs also interact with databases to provide services and routing.

Service control points (SCP) are often referred to as SS7 services databases. One or more SCPs can serve as a central intelligence point in the network for determining how and if calls are to be routed through the network. Queries and responses to and from the SCP are carried over SS7 signalling links in the form of packet messages.

Signal transfer points (STP), are special SS7 nodes which provide a message switching function between other nodes and a SS7 network. Acting as a packet switch, it examines incoming messages and then routes them over the appropriate signalling link to the proper destination switching offices and databases. In this particular function, it supports end-to-end signalling, i.e. in transit (local, tandem and toll) connections, required for transaction messaging used for special services. Unlike other SS7 nodes, the STP does not generally act as a source or sink for service related SS7 messages.

Figure 1:
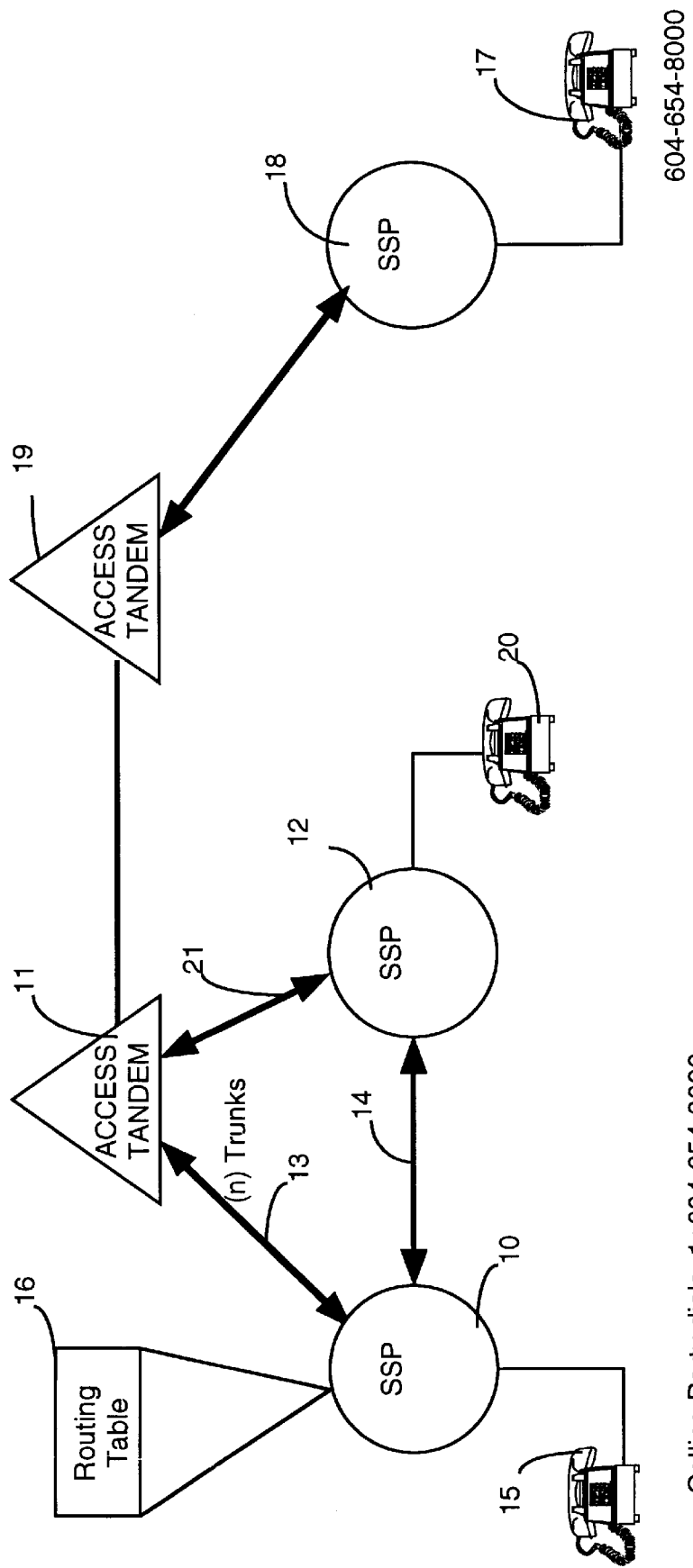
FIG. 1 is a block diagram illustrating typical interconnections of outgoing trunks according to the prior art.

Referring now to FIG. 1, we have shown a network block diagram illustrating typical interconnections between a first local telephone exchange 10 and an access tandem or toll office 11 and a second local telephone exchange 12 via inter-office trunks 13 and 14 respectively. Telephone exchanges 10 and 12 are SSPs of the class 5 type, such as DMS-100 switches manufactured by Northern Telecom Ltd. The SSPs are typically connected to an access tandem or toll offices such as office 11 via an STP which is not shown for sake of clarity. A DMS-200 or DMS-250 manufactured by Northern Telecom can operate as an access tandem or toll office.

A subscriber 15 who is served by telephone exchange 10 makes a toll call to subscriber 17 served by local exchange 18. In order to accomplish this call, the calling party initiates a toll call to subscriber 17 by dialling 1-604-654-8000.

When the first dialled digit, i.e. 1, is received at exchange 10 and in particular routing table 16, a determination is made that subscriber 15 desires access to access tandem 11. Based on the dialled digits or destination DN, access tandem 11 will route the call to a further access tandem 19 serving local exchange 18 to enable the call to reach the called subscriber 17. Similarly, if subscriber 20 served by exchange 12 would like to make a toll call, exchange 12 will seize an appropriate trunk 21 to reach access tandem 11. Although, in this example, a toll call is made via access tandems 11 and 19, it will be understood by those knowledgeable in the art that a toll call can also be made via an inter-office trunk, such as trunk 14 connecting SSP 10 to SSP 12. A toll call could be required even if the calling party and called party are located in the same LATAs.

The concept of LATAs and inter-LATA toll calls is the result of a Regulation called equal access (EA). Equal access is an operating company tariff which provides a given subscriber access that is equal in type and quality to every inter-LATA carrier. An inter-LATA carrier is also commonly called Inter-Exchange carrier (IEC). Each IEC has a dialing arrangement, call-screening technique, routing procedure, billing record, and signalling protocol required to implement the EA environment.

The EA concept originated in the United States with the modified final judgment (MFJ) of 1982 in which AT&T lost its long-distance monopoly and was also required to divest itself of the Bell operating companies (BOCs). This divestiture action resulted in the formation of seven regional holding companies, each comprised of a number of the original BOCs. Manufacturers have implemented the EA concept according to the regulatory requirements of the 1982 MFJ. The United States EA concept is built on the geopolitically defined local access and transport areas (LATAs). A LATA is a fixed non-overlapping geographic area determined at the time of the MFJ ruling. Telecommunication services within a LATA, including local and toll calls within a LATA, are carried by Bell operating companies. Inter-LATA traffic must be carried by an inter-LATA carrier (IEC). Today, intra-LATA competition is now allowed in the United States. That is, subscribers have the capability of selecting an alternate intra-LATA carrier for intra-LATA calls as well as an inter-LATA carrier for inter-LATA calls. The BOC must transfer inter-LATA traffic to the IEC directly from the end office (EO) or via an intermediate switch called an access tandem (AT). The physical location of an IEC within a LATA is referred to as the point of presence (POP).

As a result of this newly formed competition, long distance telephone service providers in an attempt to maintain customer loyalty and satisfaction, have begun to offer pricing discounts for some time periods over and above regular time-of-day discounts. These discounts typically but not exclusively target residential subscribers.

As an example, if a special discount is offered on the first Tuesday of each month, residential callers can call any long distance destination within the North American Dialing Plan for a predetermined flat rate between, say, the hours of 6:00 and 10:00 p.m. local time. Unfortunately, long distance carriers that have offered these special discounts have found that customer response can be so overwhelming that it can lead to extreme congestion of access tandem trunks. These are access trunks seized by an SSP to route a toll call, such as trunk 13 or 21 of FIG. 1. Unfortunately, since those same access trunks are also used for incoming traffic from access tandem 11 to, say, local exchange 10 or local exchange 12, the congestion level on those trunks has also had an impact on the ability for the network to terminate incoming calls. Also, calls made by business and toll-free service customers are also affected by the inability to seize a trunk when required.

In order to alleviate this problem while still permitting long distance service providers to offer promotional long distance calls at discounted prices, the present invention offers a method of preventing call congestion on outgoing trunks from a local telephone exchange to another local exchange or to an access tandem or toll office by segregating the type of telephone traffic determined to cause congestion. Once segregated, this traffic, such as calls identified as promotional long distance traffic are provided with an alternate egress path from the originating exchange. This alternate egress path may be provided by means of a separate trunk group or overlay network, a virtual trunk group or an AIN query to an external database. In the preferred embodiment, calls which are segregated are routed via a virtual trunk group. These virtual trunks represent a predetermined percentage of the total number of trunks available between the local exchange and the access tandem or between the local exchange and an adjacent local exchange.

It should be mentioned that virtual facility groups or virtual trunks are in some applications provided to simulate finite resources, such as lines or trunks in software. The use of virtual trunks enables the telephone service provider to dynamically control access to outgoing trunks for the type of traffic determined to cause congestion of these trunks.

Although the preferred embodiment makes use of virtual trunk groups, separate dedicated physical trunks can be used or allocated for serving segregated traffic.

Figure 2A:
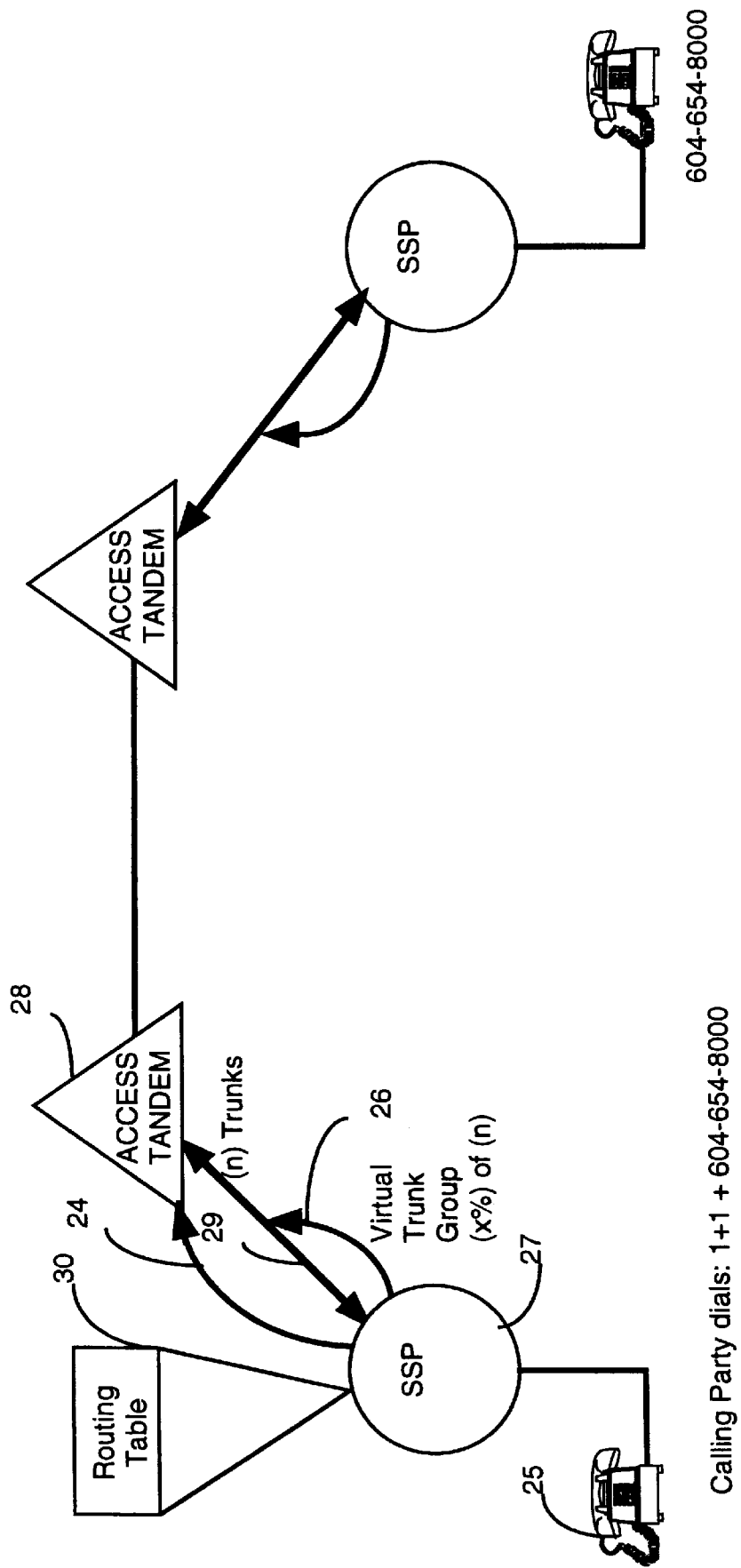
FIG. 2a is a block diagram illustrating the segregation of calls on outgoing trunks from a local telephone exchange according to a first embodiment of the invention.

Referring now to FIG. 2a, we have shown a block diagram illustrating how traffic is segregated and how virtual trunks are allocated for routing segregated traffic.

In the embodiment of FIG. 2a, a virtual trunk group 26 is set-up at the SSP 27. This virtual trunk group represents X% of the total number of outgoing trunks available, ie. (n) trunks 29. If a call is determined to require segregation, a trunk in the virtual trunk group 26 is selected to route this call. SSP 27 will continue to select additional trunks in the virtual trunk group 26 until no idle trunk remains within the virtual trunk group. At that point, the SSP administrator can either allow new calls to overflow to more trunks assigned dynamically to the virtual trunk group 26, provide the calling party with the option of completing the call at regular or more costly rates, or provide a fast busy dial tone. By using a dynamic interactive tool, a service provider can vary the percentage of trunks allocated for this promotional calls. The ability of the administrator to provide more virtual trunks will of course depend on network conditions at the time the request for additional virtual trunks is made. In the case where the calling party is provided with the option to complete the call, an announcement such as "We're sorry all lines allocated for discounted calls are presently busy" "Please try again or press 1 to complete your call at standard long distance rates". If no announcement is provided, a fast busy tone can simply be provided as is done today when all circuits are busy. The subscriber can then try the same call again or wait until trunks become available. In the call scenario of FIG. 2a, subscriber or calling party 25 requests access to promotional long distance rates by providing an additional predetermined prefix prior to the 10-digit destination DN. Since this type of call is known to cause congestion, it is segragated. In order to properly service these types of calls, a virtual trunk group 26 is set up at local exchange 27 to permit these calls to be carried on selected trunks available between exchange 27 and access tandem 28. As suggested earlier, the percentage of virtual trunks allocated can be dynamically varied according to time-of-day, usage rate and capacity of the trunks available between the two offices. Outgoing calls to access tandem 28 are assigned a virtual trunk according to the type of prefix used by the calling party. This determination will be made at routing table 30. For example, if the calling party makes use of the standard one-digit prefix (digit 1) identifying to local exchange 27 the request for a toll call, a standard trunk will be provided to the calling party to complete the call at normal long distance rates. However, if the prefix provided by the calling party identifies a request for a promotional long distance call, routing table 30 will provide local exchange 27 with information necessary to route the call via a virtual trunk if such a trunk is still available. If a virtual trunk is available, the calling party will receive the promotional rate advertised by the long distance service provider. Also, as indicated above, an alternate egress path may be provided with an alternate trunk group 24 or overlay network (not shown).

In the preferred embodiment of the invention, the prefix used by the subscriber to indicate to the local exchange a request for promotional long distance rates are the digits 1+1 followed by the 10-digit directory number of the called party. The advantage of using the prefix 1+1 is that it does not interfere with current NANP dial plans.

Figure 2B:
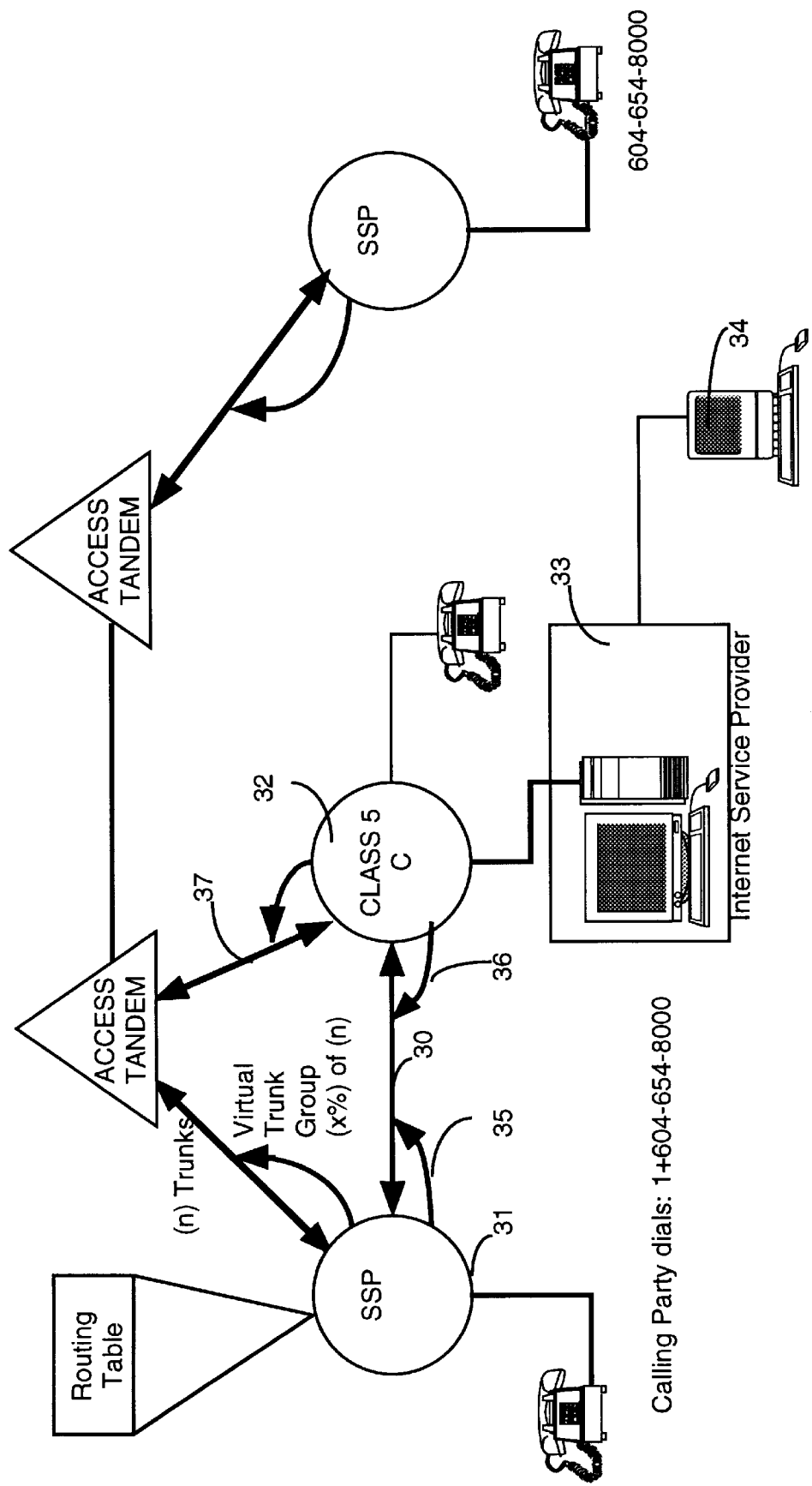
FIG. 2b is a block diagram illustrating the segregation of calls on outgoing trunks from a local telephone exchange according to a second embodiment of the invention.

The provision of virtual trunk groups can also be applied to inter-office trunks such as trunk 30 shown in FIG. 2b. Inter-office trunk 30 is set up between two local telephone exchanges, i.e. local exchanges 31 and 32. In some situations, subscribers served by local exchange 31 may be required to dial a long distance number to reach a subscriber on local exchange 32. Thus, this toll call would not be routed via an access tandem, such as access tandem 28. If this is the case, then virtual trunk groups 35 and 36 from each local exchanges 31 and 32, respectively may be assigned. This way, subscribers requiring toll services from either local telephone exchange can still select promotional long distance rates to make the call.

In addition to the above, the provision of virtual trunk groups 35 and 36 can be especially useful in situations wherein an Internet Service Provider (ISP) 33 requires access to a number of trunks to provide Internet services to subscribers such as subscriber 34. In this embodiment, any trunk required for establishing an Internet connection by Internet Service Provider 33 would be done via a virtual trunk group 35 to prevent the overloading of other trunks used for providing a communication path between local exchanges 31 and 32 for local telephone services. In situations wherein access to the ISP 33 is done via toll free 800 or 888 calls, then the call may have to reach the ISP 33 via any one of the interoffice trunks 30 or 37.

Figure 3:
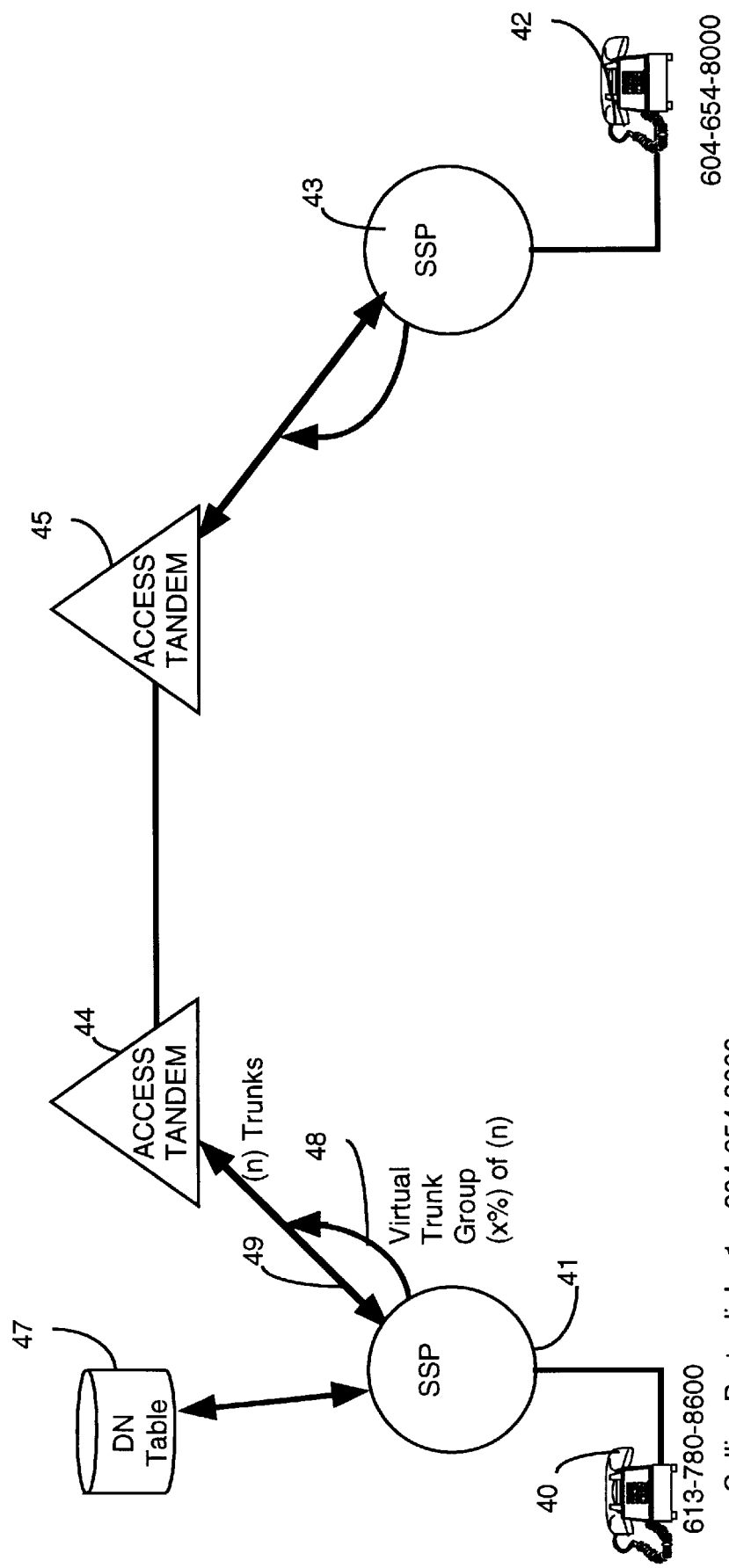
FIG. 3 is a block diagram illustrating the call treatment of calls directed to segregated trunks according to yet another embodiment of the invention.

Referring now to FIG. 3, we have shown a block diagram illustrating the segregation of promotional long distance traffic on a virtual trunk group using a database query. As in the example of FIG. 2a, the calling party 40 served by local exchange 41 is interested in placing a promotional long distance call to subscriber 42 served by local exchange 43. Subscriber 42 can only be reached from exchange 41 via access tandems 44 and 45 serving local exchanges 41 and 43 respectively. However, in this embodiment, calling party 40 makes use of the standard long distance prefix 1 followed by the 10-digit directory number of subscriber 42. Once the dialled digits are received at local exchange 41, a query is made to a directory number table 47 to determine whether the calling party 40 is eligible to receive promotional long distance rates. This would be determined based on the calling line ID of the subscriber 40 making the call. Directory Number Table 47 can either be located at local exchange 41 as part of the service profile kept by the telephone service provider or as part of a remote database such as would be contained in an SCP. A query to an external database is commonly used for AIN calls. When a query is received at DN Table 47, a verification is made to determined whether the CLID received with the query is associated with a subscriber of promotional long distance (LD) rates. If the calling party is a subscriber to LD promotions, then a response is returned to exchange 41 instructing the exchange to route the call via a virtual trunk of group 48 at the promotional LD rates. If the calling party is not a subscriber, the call proceeds at normal LD rates on standard trunks.

Once the query identifies to local exchange 41 that the subscriber 40 is eligible for promotional long distance calls, a check is made to determine whether a virtual trunk is available from the virtual trunk group 48. If a virtual trunk is available, the local exchange 41 seizes a trunk and establishes a call path with an access tandem 44 using the virtual trunk group capacity. The call is then terminated at local exchange 43 and a ringing signal submitted to subscriber 42 to establish a communication path. As indicated previously, if a virtual trunk from trunk group 48 is not available because of congestion, the subscriber may be provided with the opportunity to place the long distance call via regular trunks 49. These long distance or toll calls would of course be made at a higher rate than the promotional long distance calls.

If necessary, the telephone service provider may establish a series of virtual trunk groups to provide transport of long distance traffic offered at different levels of long distance rates. For example, a certain percentage of the available trunks between local telephone exchange 41 and an access tandem 44 may be made available on one virtual trunk group for a first level of promotional long distance call rates. For example, this first group could take, say, 25% of (n) trunks available. A second virtual trunk group could be established to take, say, 40% of (n) trunks to provide promotional long distance rates at a second level or rate structure. Therefore, a total of 75% of the available trunks could still be provided for various levels of promotional long distance rates. This would leave 25% of (n) trunks for regular long distance traffic, business and toll-free services as well as incoming traffic.

The same principle could be applied to any interoffice trunks carrying toll calls.

The particular percentages used would of course be determined by the long distance service provider to provide acceptable blockages based on statistical information.

Variations of the particular embodiment herewith described will be obvious to one skilled in the art, and accordingly, the embodiment is to be taken as illustrative rather than limiting, the true scope of the invention being set out in the appended claims.

We claim:

1. In a telephone network having a plurality of telephone exchanges interconnected via one or more interoffice trunks, a method of preventing call congestion on outgoing trunks disposed between one telephone exchange and another or between a telephone exchange and an access tandem, said method comprising the steps of:

receiving dialed digits associated with a call at a first telephone exchange;

determining whether the dialed digits are associated with a type of telephone traffic most likely to cause congestion on outgoing trunks at the first telephone exchange;

if said call is of a type most likely to cause congestion, selecting a segregated egress path for the call from said first telephone exchange; and routing said call to the segregated egress path.

2. A method as claimed in claim 1, wherein the segregated path comprises:

a virtual trunk group for carrying said segregated traffic, the virtual trunk group comprising a percentage of the outgoing trunks from the first telephone exchange.

3. A method as claimed in claim 2, wherein said step of determining comprises querying a database for routing information, which routing information routes the call to the segregated egress path.

4. A method as claimed in claim 1, wherein said egress path comprises dedicated physical trunks.

5. A method as claimed in claim 2, wherein said type of traffic most likely to cause congestion comprises special discount long distance calls.

6. A method as claimed claim 5, wherein said dialed digits include one or more digits used to identify special discount long distance calls.

7. A method as claimed in claim 6, wherein said one or more digits comprise 1+1 followed by a destination number.

8. A method as claimed in claim 6, wherein if said virtual trunk group is congested, a subscriber dialling said dialed digits used to identify a special discount long distance call is presented with an option to complete said long distance call at regular long distance rates.

9. A method as claimed in claim 3, wherein said database is enabled to perform time-of-day routing.

10. A method as claimed in claim 8, wherein said option is presented to said subscriber by playing an announcement to the calling party.

11. A method as claimed in claim 6, wherein said virtual trunk group is established at a telephone exchange serving said calling party for carrying said long distance traffic to its destination via an access tandem.

12. A method as claimed in claim 5, wherein said virtual trunk group is established at the first telephone exchange for routing traffic to a second telephone exchange when said traffic originates from subscribers dialing digits to access an Internet Service Provider.

13. A method as claimed in claim 1, wherein if the dialed digits do not contain a prefix code, said call is determined to require a segregated egress path by querying a database to determine whether the calling line ID of the calling party is associated with a requirement for the segregated egress path.

14. A method as claimed in claim 5, wherein a first percentage of said outgoing trunks is assigned to a first virtual trunk group for providing toll service at a first discount rate and a second percentage of said outgoing trunks is assigned to a second virtual trunk group for providing toll service at a second discount rate.

15. A method as claimed in claim 14, wherein if trunks of one virtual trunk group become congested, the calls most likely to cause congestion are routed to trunks from said second virtual trunk group.

16. In a telephone network having a plurality of telephone exchanges interconnected via one or more inter-office trunks, a system for preventing call congestion on outgoing trunks disposed between one telephone exchange and another or between a telephone exchange and an access tandem, said system comprising:

means at a first local telephone exchange for receiving dialed digits;

means for determining whether the dialed digits are associated with a type of telephone call most likely to cause congestion on the outgoing trunks at the first telephone exchange:

means for selecting a segregated egress path from said first telephone exchange if said call is determined to be of the type most likely to cause congestion; and means for routing said call to the segregated egress path.

17. A system as claimed in claim 16, wherein the segregated egress path comprises a percentage of said outgoing trunks which are assigned to a virtual trunk group.

18. A system as claimed in claim 17, further comprising a database that is queried to determine whether the dialed digits are associated with a telephone call of the type most likely to cause congestion in the telephone network.

19. A system as claimed in claim 17, wherein said segregated egress path comprises dedicated physical trunks.

20. A system as claimed in claim 17, wherein said traffic most likely to cause congestion in the telephone network comprises special discount long distance calls and calls made to an Internet Service Provider.

21. A system as claimed in claim 16, wherein said dialed digits include a prefix code of one or more digits used to identify special discount long distance calls.

22. A system as claimed in claim 21, wherein said prefix code is 1+1 and the prefix code is followed by a destination number.

23. A system as claimed in claim 17, wherein if said virtual trunk group is congested, a subscriber dialling digits which include a prefix code used to identify a special discount long distance call is presented with an option to complete said long distance call at regular long distance rates.

24. A system as claimed in claim 18, wherein said database is enabled to perform time-of-day routing.

25. A system as claimed in claim 23, wherein said option is presented to said subscriber by playing an announcement.

26. A system as claimed in claim 20, wherein said virtual trunk group is established at a telephone exchange serving a calling party for carrying said long distance traffic to its destination via an access tandem.

27. A system as claimed in claim 20, wherein said virtual trunk group is established at a first telephone exchange for routing traffic to a second telephone exchange when said traffic originates from subscribers accessing an Internet Service Provider.

28. A system as claimed in claim 16, wherein if the dialed digits do not contain a prefix code, said call is determined to be of the type most likely to cause congestion by querying a database to determine whether a calling line ID of a calling party requires the segregated egress path.

29. A system as claimed in claim 20, wherein a first percentage of said outgoing trunks are assigned to a first virtual trunk group for providing toll service at a first discount rate and a second percentage of said outgoing trunks are assigned to a second virtual trunk group for providing toll service at a second discount rate.

30. A system as claimed in claim 29, wherein if trunks of the first virtual trunk group become congested, the calls most likely to cause congestion are routed to said second virtual trunk group.

* * * * *